(12) United States Patent
Simske et al.

(10) Patent No.: US 6,385,351 B1
(45) Date of Patent: May 7, 2002

(54) USER INTERFACE HIGH-LIGHTER FUNCTION TO PROVIDE DIRECTED INPUT FOR IMAGE PROCESSING

(75) Inventors: Steven J. Simske, Greeley; Richard R. Lesser, Ft. Collins, both of CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/257,167

(22) Filed: Feb. 24, 1999

Related U.S. Application Data

(63) Continuation-in-part of application No. 09/164,693, filed on Oct. 1, 1998.

(51) Int. Cl.[7] .................................................. G06K 9/20
(52) U.S. Cl. ................... 382/312; 382/319; 382/311; 382/282
(58) Field of Search ........................... 382/309–315, 382/318, 319, 305, 306, 190–191, 173–176, 180, 282; 358/537, 538, 462, 464; 345/769, 770, 773, 780, 788, 794, 163, 164, 168, 179, 180, 781, 804; 707/531, 527, 517, 530

(56) References Cited

U.S. PATENT DOCUMENTS

| | | | | |
|---|---|---|---|---|
| 5,596,655 A | * | 1/1997 | Lopez | 382/173 |
| 5,619,592 A | * | 4/1997 | Bloomerg et al. | 382/175 |
| 5,949,924 A | * | 9/1999 | Noguchi et al. | 382/312 |
| 6,040,832 A | * | 3/2000 | Poreh et al. | 345/781 |
| 6,151,426 A | * | 11/2000 | Lee et al. | 382/319 |
| 6,263,122 B1 | * | 7/2001 | Simske et al. | 382/311 |

OTHER PUBLICATIONS

Jain et al., Document Representation and its Application to Page Decomposition, Mar. 1998, IEEE, Intelligence, vol. 20, No. 3, pp. 294–308.*

Pavlidis et al., Page Segmentation and Classification, Nov. 1992, IEEE vol. 54, Graphical models and Image Processing, pp. 484–496.*

* cited by examiner

Primary Examiner—Leo Boudreau
Assistant Examiner—Ishrat Sherali

(57) ABSTRACT

A user interface high-lighter function for scanner software that allows a user to automatically select a portion or several disjoint portions of text within a region of text in a preview scan of a document. When activated, the high-lighter function causes the normal mouse cursor to be replaced with a high-lighter icon having an active edge. Using the mouse, the active edge of the high-lighter icon is moved across a desired portion of text, and background pixels traversed are displayed in a different color. The traversed pixels are then used as input for an image processing routine. Text regions are generated from the traversed pixels. The beginning and ending of lines not high-lighted are cropped. A polygonal bounding box is then displayed around the selected text. An un-highlight mode can be activated to reduce the selected text. An optimized re-scan of the to selected text can now be performed.

39 Claims, 8 Drawing Sheets

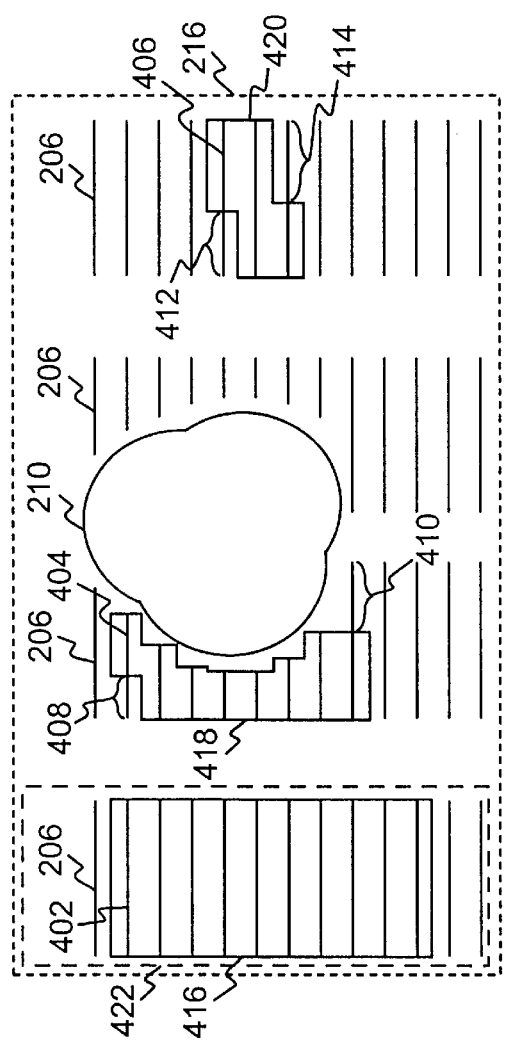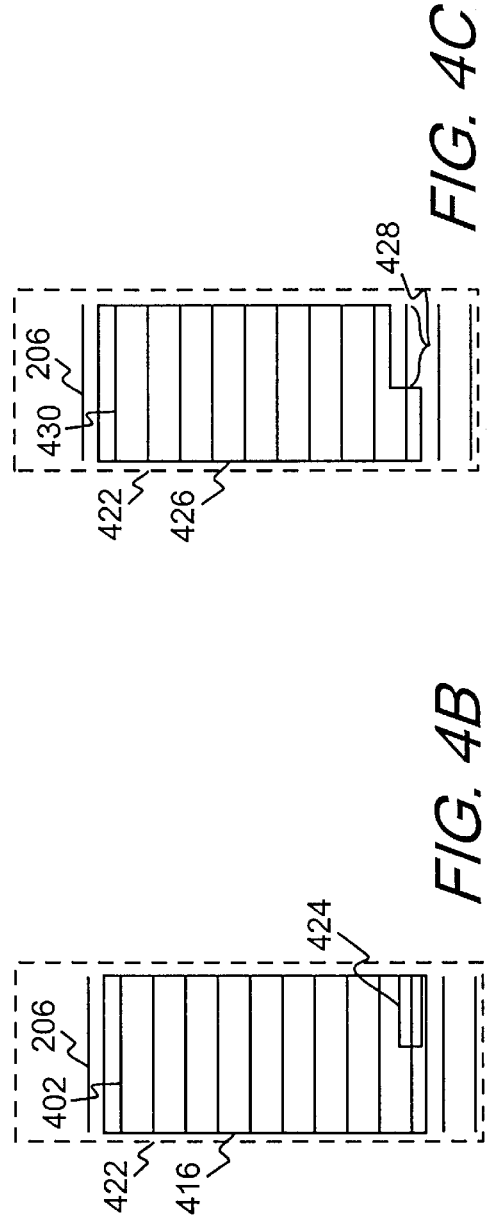
FIG. 4A
FIG. 4B
FIG. 4C

USER INTERFACE HIGH-LIGHTER FUNCTION TO PROVIDE DIRECTED INPUT FOR IMAGE PROCESSING

CROSS REFERENCE TO RELATED APPLICATIONS

This application is a continuation-in-part of application Ser. No. 09/164,693 of Jeffrey P. Lee et al. filed Oct. 1, 1998 entitled Click and Select User Interface for Document Scanning.

TECHNICAL FIELD

This invention relates to document scanners and more particularly to a user interface for document scanners. Even more particularly, the invention relates to a user interface high-lighter function for a user interface for document scanners that allows a user to automatically select a portion of text, or several disjoint portions of text, within one or more regions of text in a preview scan of a document or documents for directed input for image processing.

BACKGROUND OF THE INVENTION

Current scanner technology allows a user to capture and utilize all or portions of various scanned documents, images, objects, etc. for use within various computer applications, even when the documents are comprised of a variety of different components. A document or documents containing text, black and white and/or color photographs, graphics, and color and black and white line art can be scanned in their entirety. Alternatively, the user may choose to select only certain portions of the original document or documents for scanning by utilizing scanner software to select an area or particular image contained in a preview scan of the document or documents. The selected area is then optimally re-scanned to produce a final image that can be utilized in an end application.

The Click and Select User Interface for Document Scanning allows the user to automatically select a region of interest from the preview scan of the document or documents by positioning a mouse cursor within the region of interest, and then clicking the mouse button. Image processing is performed by the scanner software starting with the click point as input, and a bounding box is then displayed around the region of interest as determined by the image processing. The user then has the ability to readily override the first estimate of the bounding box, if it proves not to be what the user wanted, by using other functions of the user interface.

However, there are some situations where, in utilizing the Click and Select User Interface for Document Scanning, the user would not be able to override the first estimate of the bounding box to select only the desired region of interest to send to an end application. Examples are when a user wishes to select only a portion of a text region that cannot be confined in a rectangular box, or the user wishes to select two or more disjoint portions of text within a text region.

It is thus apparent that there is a need in the art for an improved method or apparatus which solves the objects of the invention. The present invention meets these and other needs in the art.

This application is a continuation-in-part of application Ser. No 09/164,693 of Jeffrey P. Lee et al. filed Oct. 1, 1998 entitled Click and Select User Interface for Document Scanning, which is incorporated herein by reference for all that is disclosed and taught therein.

SUMMARY OF THE INVENTION

It is an aspect of the present invention to provide a user interface for scanner software that allows a user to easily select specific portions of text regions from a preview scan of a document or documents.

It is another aspect of the invention to use a high-lighter function, which is an easy, logical, and familiar motif, for selecting specific portions of text regions from a preview scan of a document or documents.

Yet another aspect of the invention is to allow a user to use a high-lighter function to select two or more disjoint portions of text within text regions from a preview scan of a document or documents.

Still another aspect of the invention is to utilize the pixels traversed by an active edge of a high-lighter icon as input to an image processing routine to determine a selected bit-mapped data area.

A further aspect of the invention is to display a polygonal bounding box around the selected bitmapped data area as determined by an image processing routine.

A still further aspect of the invention is to deselect portions of text that have been selected utilizing a high-lighter icon in an un-high-lighter mode.

Another aspect of the invention is to utilize the selected bitmapped data area represented by the selected text as input for an optimized re-scan of the document or documents.

The above and other aspects of the invention are accomplished in a user interface for scanner software that allows a variable resolution preview scan of a document or documents to be presented to the user in a variable resolution preview window of a computer monitor. In the preferred embodiment of the invention, the Click and Select User Interface for Document Scanning is used allowing a user to click on a point within a region of interest in the variable resolution preview window that represents the underlying bitmapped data from the variable resolution preview scan. Based on the characteristics of the bitmapped data represented at the click point, an image processing routine determines an area that encompasses the click point and the neighboring points that have similar characteristics to that of the bitmapped data at the click point. This area is then classified by type based on the characteristics of the bitmapped data represented within the area, such as text, grayscale image, color image, or black and white image. A selection marker is then automatically displayed around the area as a first estimate of what the user intended by making the mouse click at the click point.

The selection marker may be a bounding box rectangular in shape. For non-rectangular "lasso" regions, image analysis software may be applied, automatically tracing around the lasso region of interest. Portions of the scanned document or documents that lie outside the selection marker are grayed out. Based on the determination of the type of area, adjustments are made automatically to data type, exposure, color, resolution, and sharpness settings.

If the selection marker automatically generated does not represent the image of interest desired by the user, the user can adjust the size of the region of interest to include more area or include less area in several different ways. One such way is by dragging the selection marker handles appropriately, expanding or contracting the selected area. Or, the user may simultaneously click on a point and hold down a control key on a keyboard, or right click on the mouse, to either expand the region or image of interest to include additional area, or contract the region or image of interest to exclude area already selected. The user may also right click on the mouse to pop up a context menu, and select an "Expand Selection" option or select a "Contract Selection" option from the menu. In addition, a different region of interest can be selected by the user by clicking in an unselected area of the variable resolution preview scan, and dragging the mouse to create a rectangular area bounded by a rectangular selection marker.

Based on the type of image, floating windows displayed on the monitor having tools for adjusting various aspects of the selected area are automatically enabled or disabled from user input. Once the region of interest is properly selected, and any adjustments have been made, the user can use a mouse to drag and drop the selected area onto the desktop, a writeable folder, or onto an open application to launch an optimized final scan, or re-scan, of the selected area. After the optimized re-scan, the resulting image data resides in the desktop, folder, in a file, or within the open application. Alternatively, the user may utilize pull down menus or buttons to launch the optimized re-scan. However, if the pull down menu is used, then "save to file", "copy to clipboard", and "print" are the only options available. Thus, the resulting image data will not automatically appear in an open application if this option is utilized.

Both OCR (optical character recognition) packages and the Click and Select User Interface for Document Scanning provide automated segmentation of text regions. Lines, paragraphs, and even columns of text are generated by these text-processing methods. However, neither of these two solutions is convenient for selecting only specific portions of text within a text region, such as a few lines from a single paragraph, or multiple lines from adjacent paragraphs, or disjoint text from various text regions in the preview scan of a document or documents. OCR packages will typically convert an entire set of paragraphs into their ASCII form, after which the user will need to make corrections and delete the words they did not wish to select. Similarly, when using the Click and Select User Interface for Document Scanning, often more text than the user actually intended to select will be generated from image processing the bitmapped data in the preview scan. The user will have to change the outlining boundary (as is also the case for OCR) to select only the specific text that they are interested in. This is a process that can be confusing and cumbersome if the text region cannot be bounded rectangularly, as when the specific text does not start or end at the start and end of lines in the text column or paragraph, or when the text wraps around an image, etc.

To enable selection of specific portions of text, the present invention employs a high-lighter function as part of the user interface for scanner software. The scanning software provides a high-lighter icon, which is a bitmapped tool, at the user interface level. The high-lighter icon can be activated to replace the normal mouse cursor either by a tool bar menu, or by right clicking the mouse to access a pop-up menu, and then selecting an "Activate High-Lighter" option from the tool bar menu or the pop-up menu. When the user wants to highlight text, the user holds down the left mouse button and drags the active edge of the high-lighter icon over the desired portions of text displayed on the monitor. The non-text or "background" pixels on the monitor traversed by the active edge of the high-lighter icon are changed to a different color, such as yellow or pink, to visually indicate to the user which portions of text have been traversed by the high-lighter icon. The text pixels are left unchanged, giving the visual effect one would have if a real high-lighter pen were used on a real piece of paper containing text. The user interface can be returned to the default (non-high-lighter) mode by a tool bar menu, or by right clicking the mouse to access a pop-up menu, and selecting a "Deactivate High-Lighter" option from the tool bar menu or the pop-up menu.

After high-lighting text, in the preferred embodiment of the invention, the image processing routine of the Click and Select User Interface for Document Scanning uses the set of high-lighted pixels as the substitute input instead of a click point. Text regions are generated from these pixels until the selected text exhausts all of the high-lighted pixels. The regions are then cropped as necessary to prevent adding non-high-lighted text at the beginning and end of high-lighted lines. A polygonal bounding box is then displayed around the selected portions of text, and the background pixels that were changed to a different color are restored to their original color. In an alternative embodiment of the invention, all the background pixels within the polygonal bounding box are changed to the high-lighter color. An optimized re-scan can now be performed utilizing the bitmapped data represented by the selected text areas within the polygonal bounding boxes.

DESCRIPTION OF THE DRAWINGS

The above and other aspects, features, and advantages of the invention will be better understood by reading the following more particular description of the invention, presented in conjunction with the following drawings, wherein:

FIGS. 4A, 4B, and 4C show, from the portion of the screen display of FIG. 3, the results of image processing the high-lighted pixels by displaying polygonal bounding boxes surrounding the selected portions of text.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
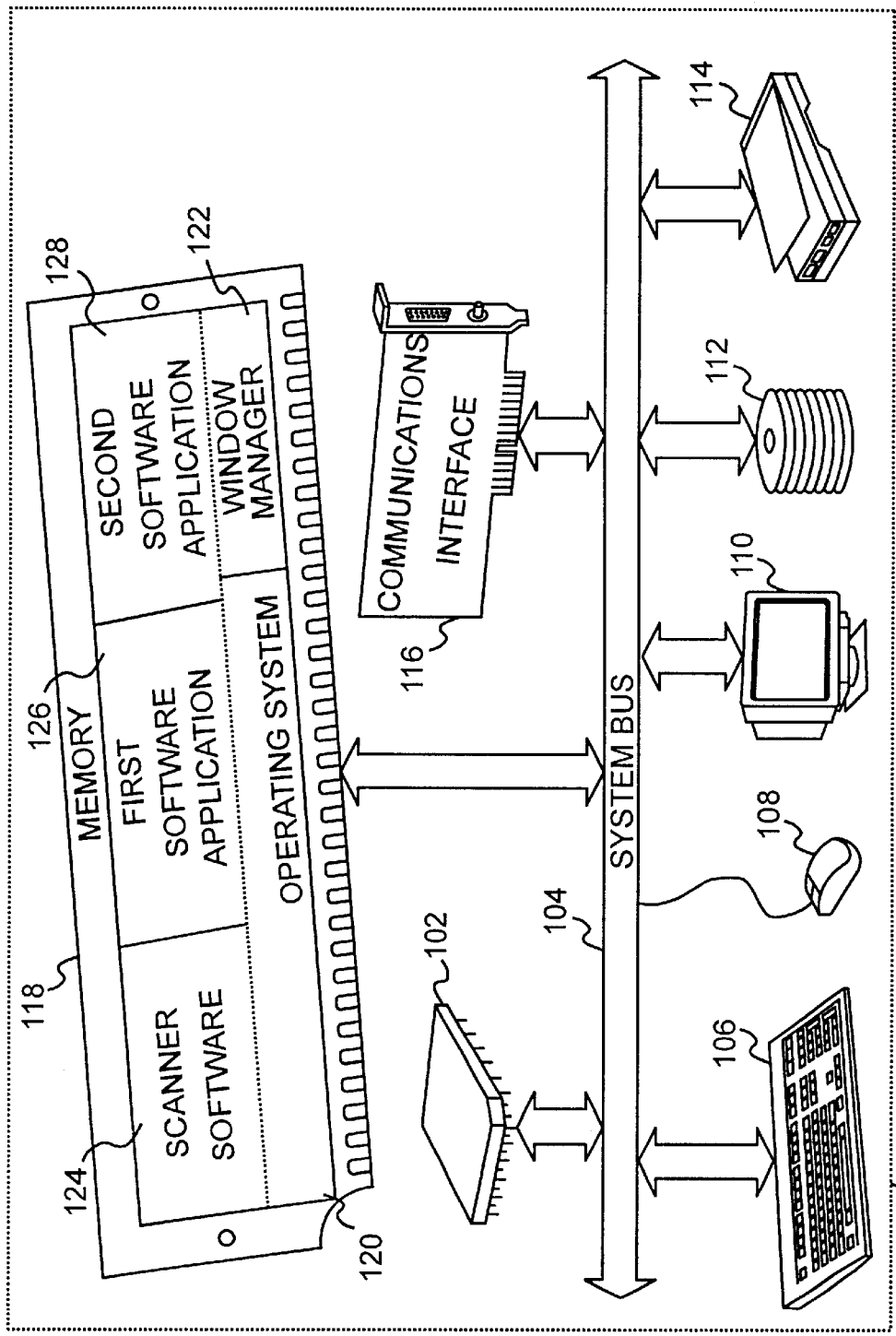
FIG. 1, shows a block diagram of a computer system incorporating the user interface high-lighter function for scanner software of the present invention.

FIG. 1 shows a block diagram of a computer system incorporating the user interface high-lighter function for scanner software of the present invention. One skilled in the art will recognize that many other configurations are possible for accessing a scanning device with a computer system. Only one configuration is shown for simplicity. Referring now to FIG. 1, computer system 100 contains a processing element 102. Processing element 102 communicates with other elements of computer system 100 over a system bus 104. A keyboard 106 allows a user to input information into computer system 100 and a monitor 110 allows computer system 100 to output information to the user. A graphical input device 108 is also used to input information. In the preferred embodiment of the invention, graphical input device 108 is a mouse. Scanner device 114 is also used to input information to computer system 100. Scanner device 114 may be a flatbed scanner, a portable hand held document scanner, or any other digital capturing device.

Storage device 112 is used to store data and programs within computer system 100. Communications interface 116, also connected to system bus 104, receives information from sources outside of computer system 100. A memory 118, also attached to system bus 104, contains an operating system 120, window manager 122, and scanner software 124 having the user interface high-lighter function for scanner software of the present invention. In the preferred embodiment of the invention, operating system 120 is the Microsoft Windows® operating system. Memory 118 also contains first software application 126 and second software application 128. One skilled in the art will recognize that many more software applications could reside in memory 118. Only two are shown for simplicity.

Figure 2:
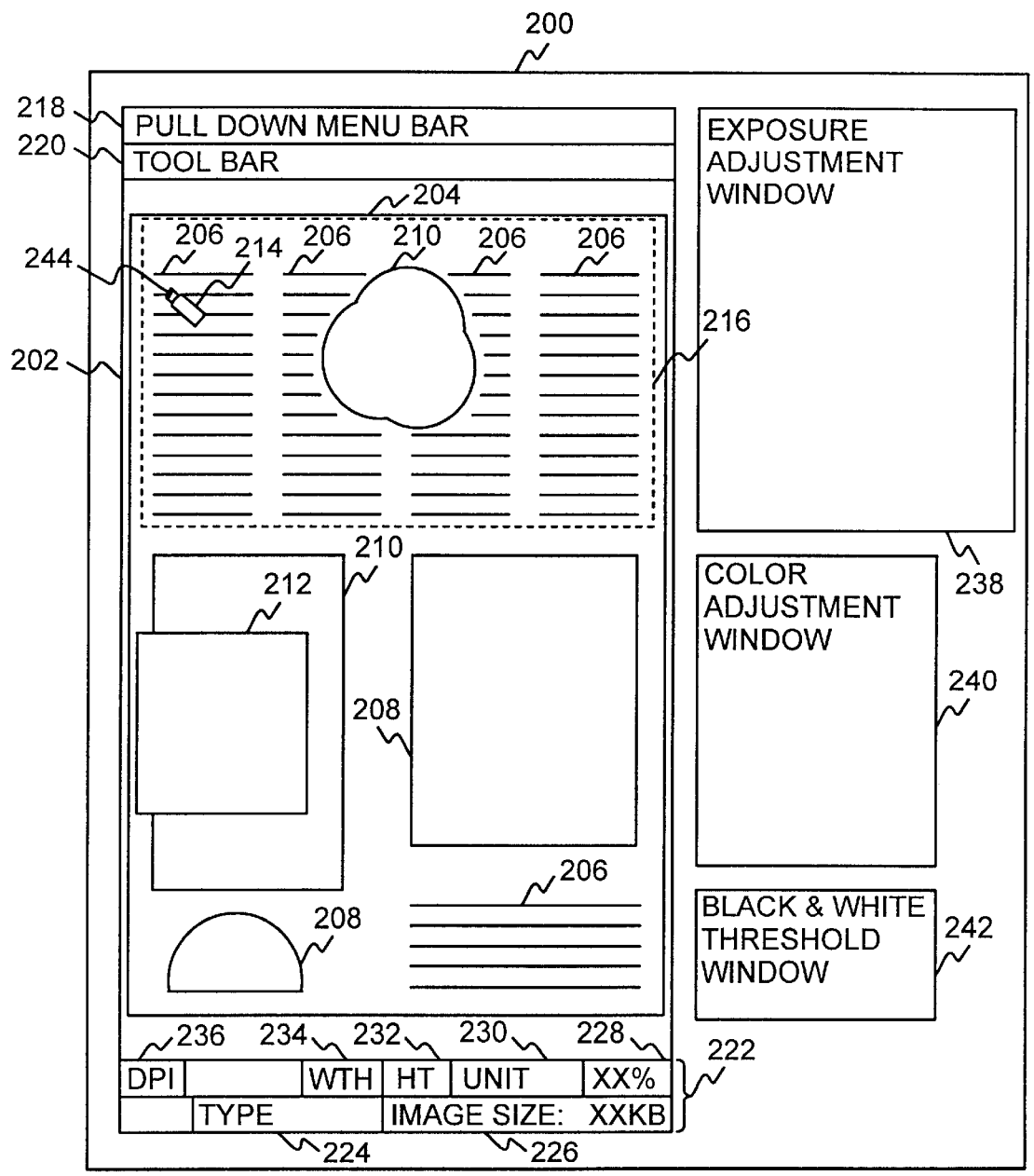
FIG. 2 shows a representation of the screen display of a computer monitor showing the high-lighter icon of the user interface high-lighter function for scanner software of the present invention.

FIG. 2 shows a representation of the screen display from monitor 110 (FIG. 1) showing the high-lighter icon of the user interface high-lighter function for scanner software 124 (FIG. 1) of the present invention. Referring now to FIG. 2, scanner software window 200 shows a variable resolution preview window 202 containing variable resolution preview scan 204 of a document or documents that have been scanned by scanner device 114 (FIG. 1). A user initiates variable resolution preview scan 204 by pressing a preview scan mode button on scanner device 114, or through click input on a scan button or pull down menu presented to the user on monitor 110 through scanner software 124, which sends a signal causing scanner device 114 to use a preview scan mode to scan the document or documents in position to be scanned by scanner device 114. A preview scan mode is typically a low resolution scan, dependent upon the resolution of the display and the size of the preview window. A user may also initiate a zoom scan of an area of the document or documents positioned to be scanned by scanner device 114, in which case the resolution of the data contained in variable resolution preview window 202 may be that of scanner device 114, which could be a considerably higher resolution than the preview scan mode. The bitmapped data generated from the preview scan mode is displayed as variable resolution preview scan 204 in variable resolution preview window 202. Variable resolution preview scan 204 shows regions of various types, including text regions 206, black and white line art regions 208, color photograph regions 210, and gray scale photograph region 212, which is partially superimposed on one of the color photograph regions 210.

When a user selects the "Activate High-Lighter" option, the normal mouse cursor is replaced by a high-lighter icon 214, which in FIG. 2 has been positioned by the user utilizing graphical input device 108 (FIG. 1) within predominantly text region 216. In the preferred embodiment of the invention, graphical input device 108 is used to drive high-lighter icon 214.

Variable resolution preview window 202 also contains pull down menu bar 218 and tool bar 220, which provide the user with access to various functions of scanner software 124. If no region has been selected, status bar 222 displays information regarding variable resolution preview scan 204 in its entirety. If a region has been selected, status bar 222 displays current information regarding the region selected. Box 224 will indicate the type of region, such as gray scale photographic image, color image, text, etc. Box 226 indicates the image file size in KB. A scaling factor is shown in box 228. A different scaling factor may be displayed if an inter-application communication link, such as TWAIN or OLE, has been established indicating a preferred final size of the region of interest, or if the user has specified one. Box 230 indicates the unit of measure for a selected image, such as centimeters, inches, points, or pixels. Box 232 indicates that the height of a selected image, and box 234 indicates the width of a selected image. Box 236 indicates the current resolution in dots per inch.

Three floating windows are also shown in scanner software window 200 that present control tools to the user. The controls reflect adjustments made to variable resolution preview scan 204 based on the contents of the preview window. The user may use the tools presented in the floating windows to further manipulate a selected region of interest.

Exposure adjustment window 238 offers control tools that apply to all photographic output data types to preserve highlight and shadow detail. Color adjustment window 240 applies only to color photographic output data types to adjust hue and saturation. Black and white threshold window 242 applies only to black and white binary output data types such as line art, clip art, halftones, and text.

Figure 3:
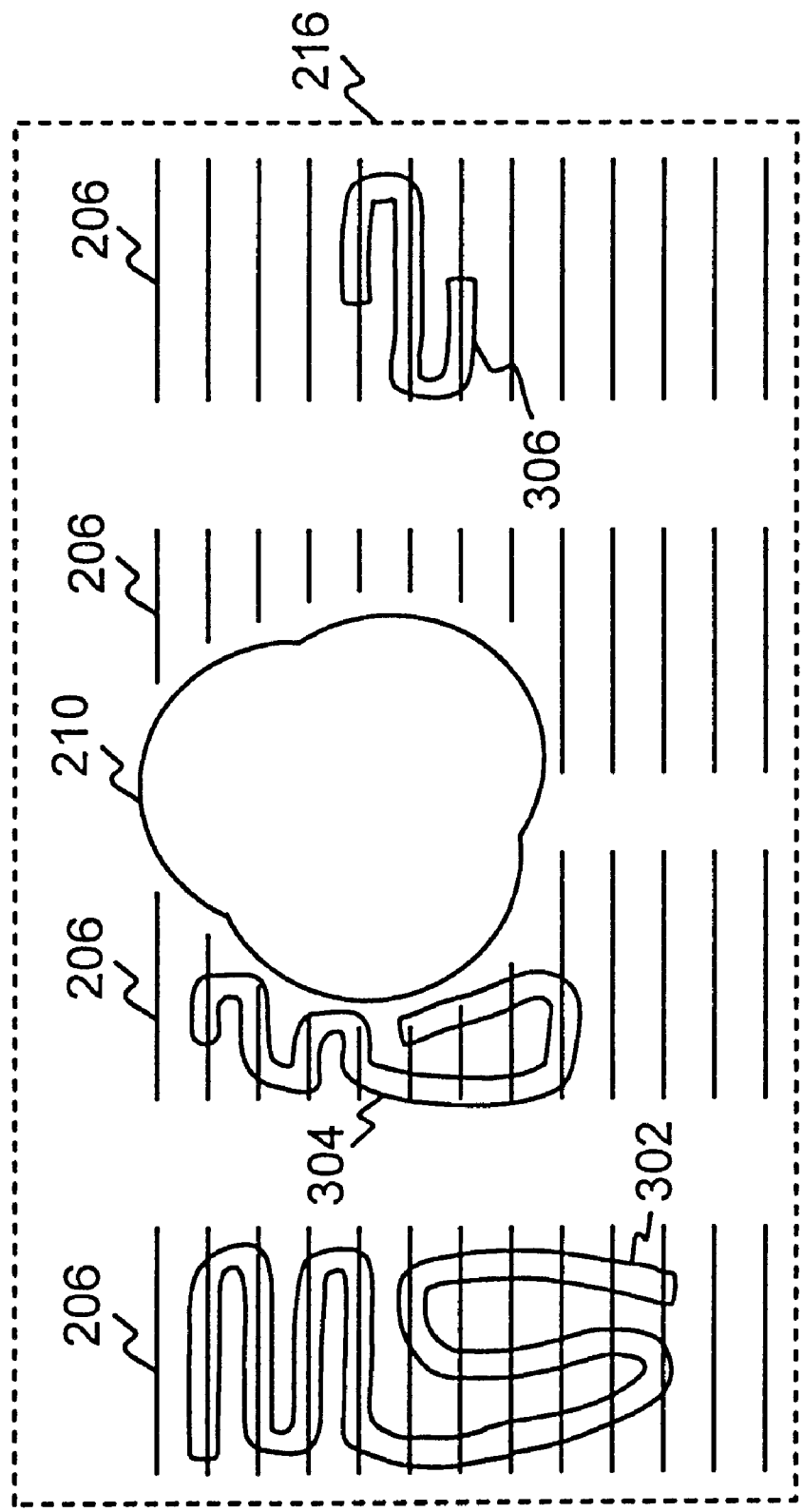
FIG. 3 shows a portion of the screen display from FIG. 2 that has had text portions high-lighted utilizing the high-lighter icon of the user interface high-lighter function for scanner software of the present invention.

FIG. 3 shows a portion of the screen display from FIG. 2 that has had text portions high-lighted utilizing the high-lighter icon of the user interface high-lighter function for scanner software of the present invention. Referring now to FIG. 3, predominantly text region 216 is shown having four text regions 206 and color photograph region 210. A user has held down the left mouse button and dragged the active edge 244 of high-lighter icon 214 (FIG. 2) over three separate portions of the text regions 206, indicated by highlight area 302, highlight area 304, and highlight area 306. High-lighter icon 214 may be made available to the user in several different sizes for ease of use in selecting text of different sizes. Thus, the length of active edge 244 may vary such that a differing number of pixels may be selected by the active edge 244. The button down input selects a beginning line of pixels that lie along the active edge 244 at the button down starting location. The drag input selects a region of pixels traversed by the active edge 244 during an interim movement. The button up input at the end of the drag input interim movement selects an ending line of pixels that lie along the active edge 244 at the button up ending location. In the preferred embodiment of the invention, the background portions of the pixels traversed by the active edge 244 of high-lighter icon 214 are displayed in a different color from the current background color for the background pixels as movement occurs. The different color, such as yellow or pink, visually indicates to the user which portions of text have been traversed by the active edge 244 of high-lighter icon 214 as movement occurs, while allowing the text pixels within the high-lighted area to still be visible in their original color. This is done using a simple thresholding (binarizing) algorithm to distinguish foreground from background.

FIGS. 4A, 4B, and 4C show, from the portion of the screen display of FIG. 3, the results of image processing the high-lighted pixels by displaying polygonal bounding boxes surrounding the selected portions of text. Referring now to FIG. 4A, after the user has high-lighted the desired portions of text in FIG. 3 with high-lighter icon 214 (FIG. 2), the user accesses a tool bar menu, or pull down menu, and selects a "Select Text" option. Scanner software 124 (FIG. 1)

receives, as input for an image processing routine, the high-lighted pixels, which includes the beginning line of pixels, the ending line of pixels, and the pixels traversed by the active edge 244 (FIG. 2) of high-lighter icon 214, for each portion of high-lighted text. The image processing routine begins processing with the bitmapped data represented by the pixels within the high-lighted areas. In the preferred embodiment of the invention, the high-lighted pixels serve as substitute input for the click point of the Click and Select User Interface for Document Scanning. Text regions are generated from the bitmapped data from these high-lighted pixels until the selected text "exhausts" all of the high-lighted pixels. The regions are cropped as necessary to prevent adding non-high-lighted text at the beginning and end of high-lighted lines.

After image processing the bitmapped data within highlight area 302 (FIG. 3), the high-lighted background pixels within highlight area 302 are redisplayed in their original background color, and a polygonal bounding box 416 is displayed around selected bitmapped data area 402. After image processing the pixels within highlight area 304 (FIG. 3), the high-lighted background pixels within highlight area 304 are redisplayed in their original background color, and a polygonal bounding box 418 is displayed around selected bitmapped data area 404. Cropped portions of text not selected are shown by cropped text 408 and cropped text 410. After image processing the pixels within highlight area 306 (FIG. 3), the high-lighted background pixels within highlight area 306 are redisplayed in their original background color, and a polygonal bounding box 420 is displayed around selected bitmapped data area 406. Cropped portions of text not selected are shown by cropped text 412 and cropped text 414. If the user now launches an optimized re-scan, selected bitmapped data area 402, selected bitmapped data area 404, and selected bitmapped data area 406 will be processed by scanner software 124. In an alternative embodiment of the invention, all the background pixels within the polygonal bounding boxes are displayed in the highlight color, and the text is displayed in its original color.

FIG. 4B shows area 422 from FIG. 4A. Referring now to FIG. 4B, if, after polygonal bounding boxes 416, 418, and 420 are displayed, the user determines that too much text was automatically selected, the user can use high-lighter icon 214 to de-select the unwanted text. The user accesses a tool bar menu, or pull down menu, and selects an "Activate Un-Highlight" option to activate an un-highlight mode. The user then holds down the left mouse button and drags the active edge 244 of high-lighter icon 214 (FIG. 2) over the unwanted text. The background portions of the pixels traversed by the active edge 244 of high-lighter icon 214 are displayed in a different color from the current background color for the background pixels as movement occurs, as indicated by highlight area 424, selecting a portion of text within selected bitmapped data area 402 bounded by polygonal bounding box 416. The user then accesses a tool bar menu, or pull down menu, and selects a "Select Text" option. The same underlying analysis technology is used for un-highlighting as for highlighting.

FIG. 4C shows area 422 from FIG. 4B. Referring now to FIG. 4C, scanner software 124 (FIG. 1) receives the high-lighted pixels within highlight area 424 as input for the image processing routine, which in the preferred embodiment of the invention is the Click and Select User Interface for Document Scanning. The image processing routine processes the bitmapped data represented by the pixels within highlight area 424. After image processing, the high-lighted background pixels within highlight area 424 are redisplayed in their original background color, along with the any text pixels, as cropped text 428. Altered polygonal bounding box 426 is displayed around reduced selected bitmapped data area 430. In an alternative embodiment of the invention, where the background pixels within the polygonal bounding box are displayed in the highlight color, the background pixels traversed in the un-highlight mode are redisplayed in the original background color.

If, after polygonal bounding boxes 416, 418, and 420 are displayed, the user determines that not all the desired text was automatically selected, then the user can use high-lighter icon 214 to highlight the additional text adjacent to one of the polygonal bounding boxes. The user then accesses a tool bar menu, or pull down menu, and selects a "Select Text" option. Scanner software 124 (FIG. 1) receives the new high-lighted pixels from the additional text as input for the image processing routine. The image processing routine processes the bitmapped data represented by the high-lighted pixels. After image processing, the resulting new bitmapped area is added to the current bitmapped area to create an expanded selected bitmapped data area, the high-lighted background pixels within the new bitmapped area are redisplayed in their original background color, and an expanded polygonal bounding box is displayed around the expanded selected bitmapped data area (not shown in FIG. 4).

Figure 5A:
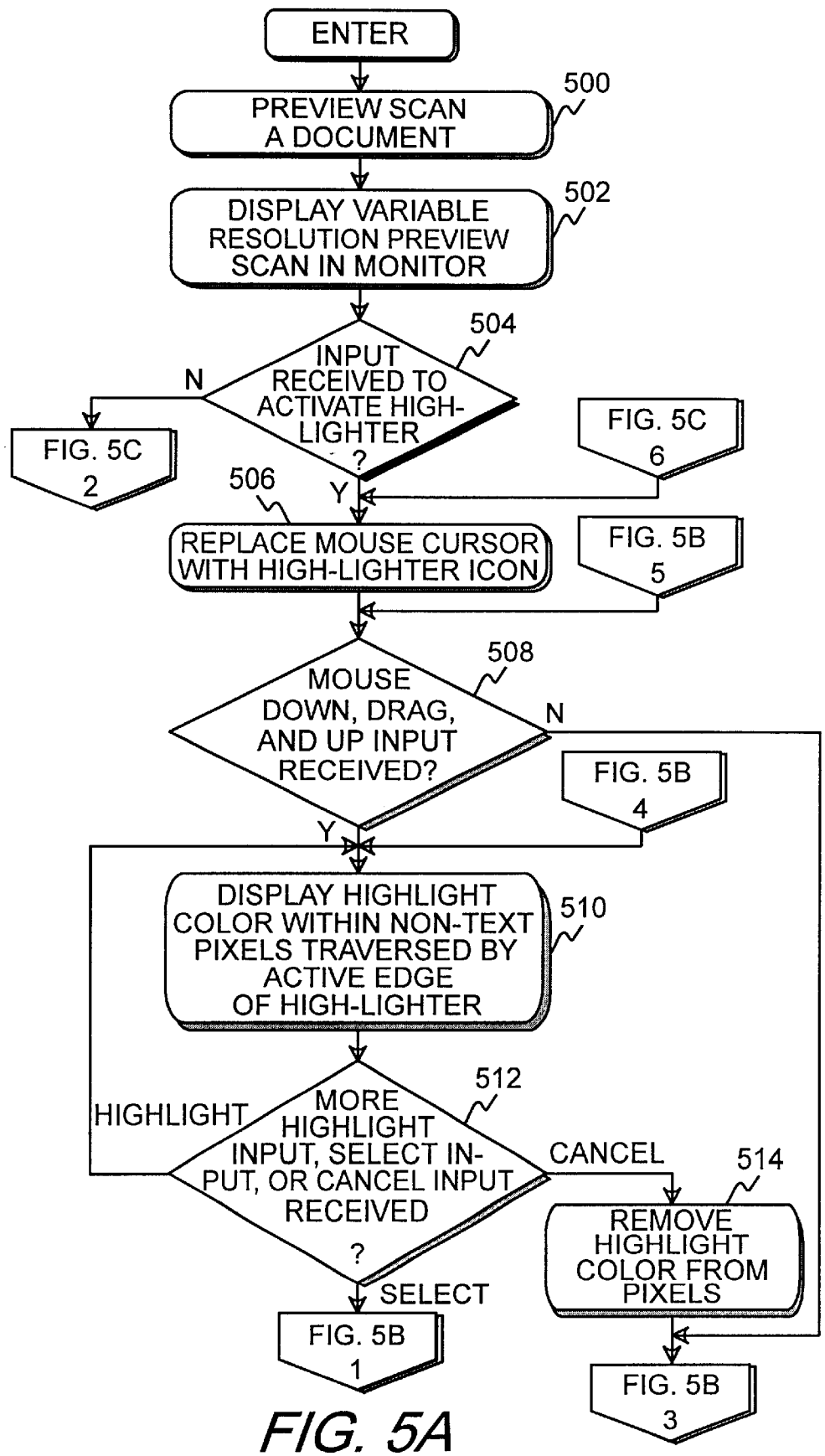
FIGS. 5A, 5B, and 5C show a block diagram of the overall flow of the operation of the user interface high-lighter function for scanner software of the present invention.
Figure 5B:
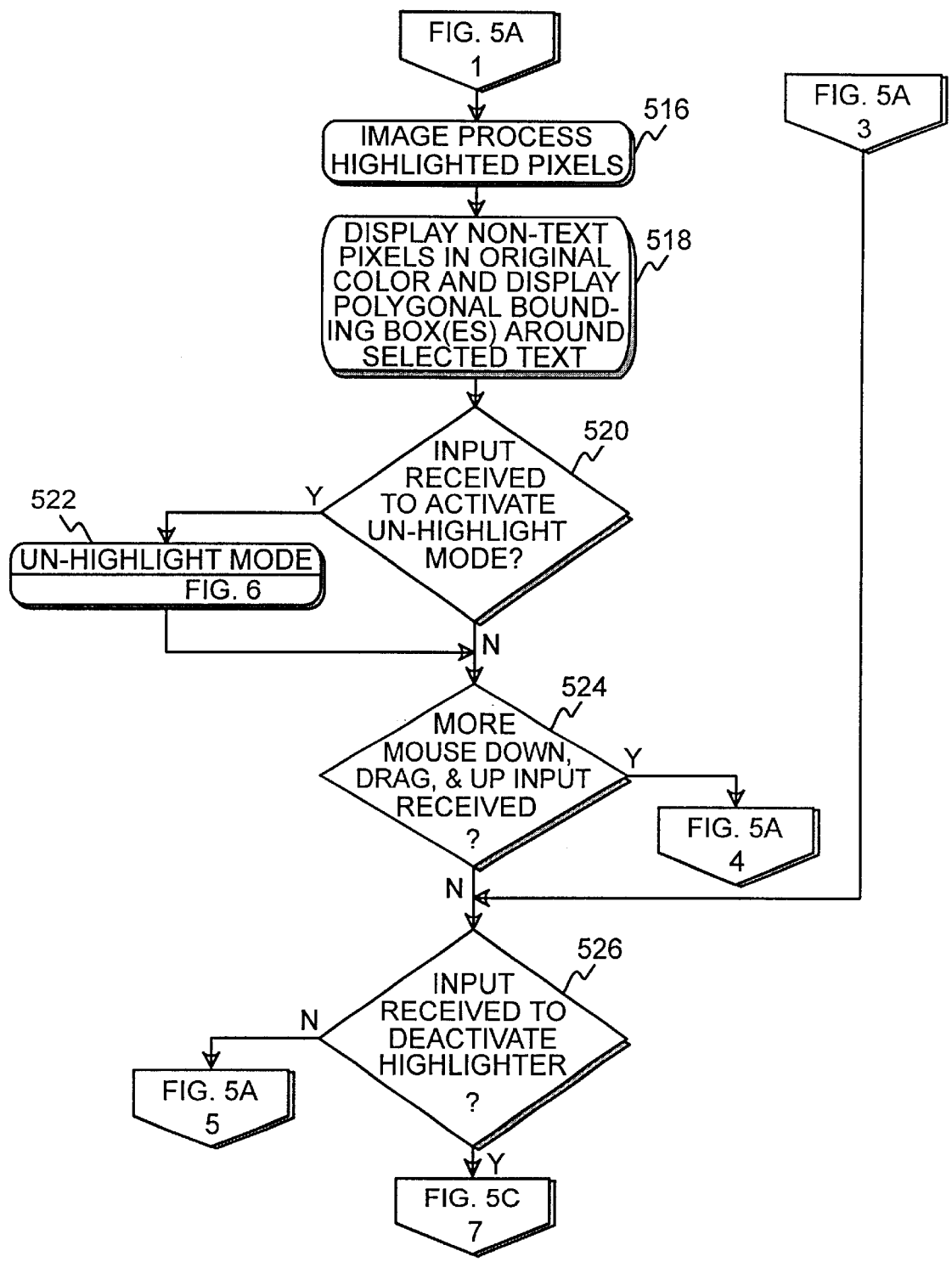
Figure 5C:
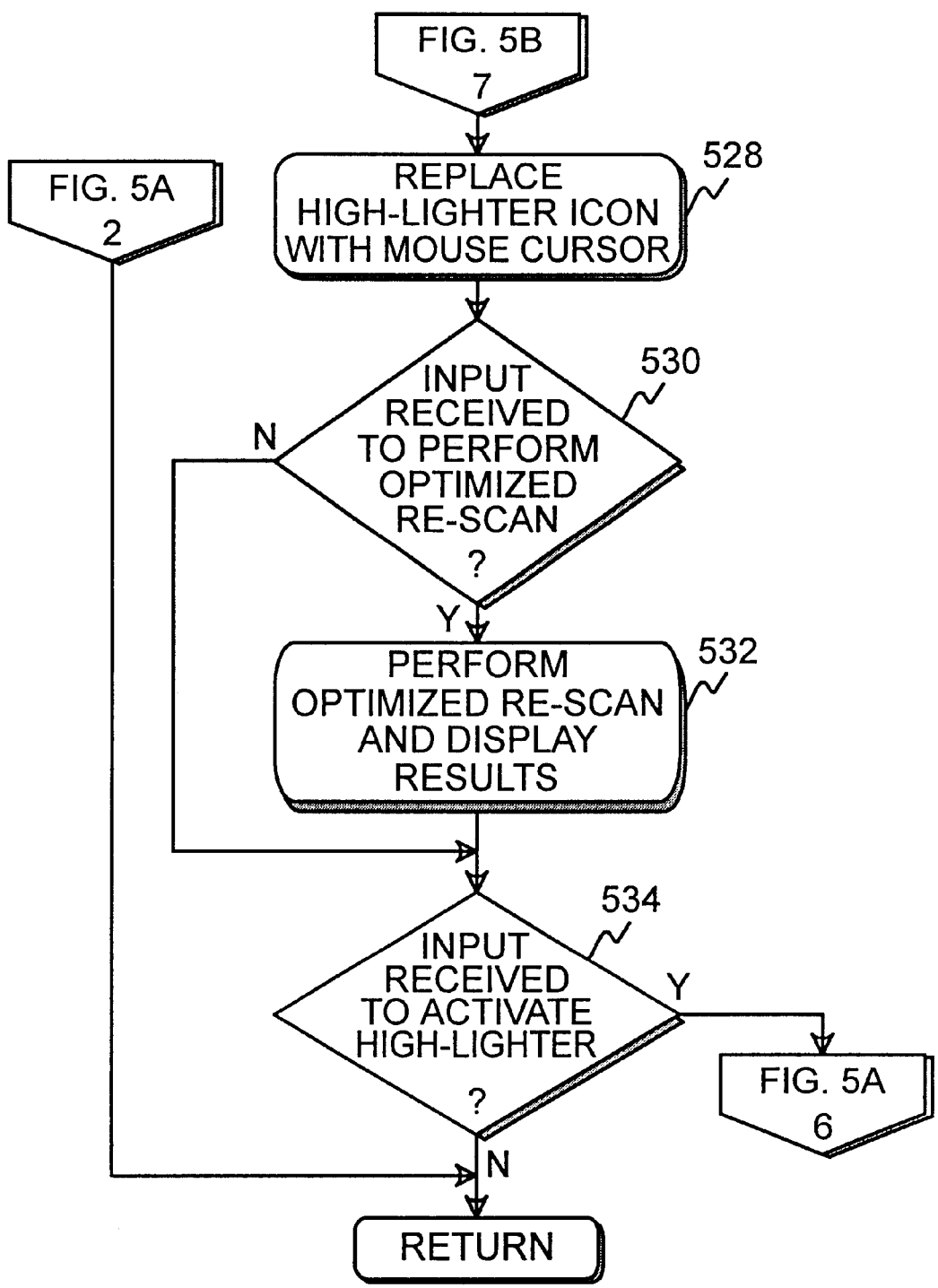

FIGS. 5A, 5B, and 5C show a block diagram of the overall flow of the operation of the user interface high-lighter function for scanner software of the present invention. The user interface is called from scanner software 124 (FIG. 1), when requested by the user of the scanner software 124. Scanner software 124 performs other scanner functions which are not part of the invention.

Referring now to FIGS. 5A, 5B, and 5C, after entry, in step 500 a variable resolution preview scan is initiated for a document or documents by scanner device 114 (FIG. 1) that may contain bitmapped data representing text, line art, and/or color and black and white photographic images of interest. In step 502, variable resolution preview scan 204 (FIG. 2) representing the bitmapped data is displayed within variable resolution preview window 202 (FIG. 2) in monitor 110 (FIG. 1).

Step 504 determines if input is received to activate the user interface high-lighter function, such as through click input received from graphical input device 108 (FIG. 1) on an "Activate High-Lighter" option from a tool bar menu, or from a pop-up menu accessed by right clicking graphical input device 108. If no input to activate the user interface high-lighter function is received in step 504, control returns to scanner software 124 (FIG. 1) where the user may access other functions within scanner software 124. If input to activate the user interface high-lighter function is received in step 504, then in step 506 the current mouse cursor is replaced with high-lighter icon 214 (FIG. 2).

Step 508 determines if button down, drag, and up input is received, indicating that the user has selected a portion of text within variable resolution preview scan 204 with graphical input device 108. If no button down, drag, and up input is received in step 508, control transfers to step 526. If button down, drag, and up input is received in step 508, then in step 510 the background pixels traversed by the active edge 244 of high-lighter icon 214 (FIG. 2) are displayed in a different color from the current background color to visually indicate the portion of variable resolution preview scan 204 that the active edge 244 of high-lighter icon 214 has traversed. Text pixels traversed by active edge 244 of high-lighter icon 214 are left in their original color.

Step 512 then determines if more input is received from high-lighter icon 214 for high-lighting text, or if input is received to cancel text high-lighting, or if input is received to select the text that has been high-lighted. If more button down, drag, and up input is received, indicating that the user has selected another portion of text within variable resolution preview scan 204, then control returns to step 510. If cancel input is received in step 512, such as through click input received from graphical input device 108 on a "Remove Highlight" option from a tool bar menu, or from a pop-up menu accessed by right clicking graphical input device 108, then in step 514 the background pixels that were displayed in a different color are redisplayed in their original background color. Control then passes to step 526. If input is received to select text in step 512, such as through click input received from graphical input device 108 on a "Select Text" option from a tool bar menu, or from a pop-up menu accessed by right clicking graphical input device 108, then in step 516, the pixels traversed by the active edge 244 of high-lighter icon 214 from step 510 are image processed. In the preferred embodiment of the invention, the pixels traversed, including the beginning line and ending line of pixels, are used as substitute input for the click point of the Click and Select User Interface for Document Scanning. The image processing determines a selected bitmapped data area, such as selected bitmapped data area 402 (FIG. 4).

In step 518 the background pixels traversed by active edge 244 of high-lighter icon 214 are displayed in their original color, and a polygonal bounding box is displayed around the selected bitmapped data area determined in step 516, such as polygonal bounding box 416 (FIGS. 4A and 4B). The text pixels are displayed in their original color. In an alternative embodiment of the invention, all the background pixels within the polygonal bounding box are displayed in the highlight color, and the text pixels are displayed in their original color.

Step 520 determines if input is received to activate an un-highlight mode. If yes, control passes to step 522, which calls FIG. 6. Upon returning from FIG. 6, control passes to step 524. If no input is received to activate an un-highlight mode in step 520, then step 524 determines if more button down, drag, and up input is received, indicating that the user has selected another portion of text within variable resolution preview scan 204. If no button down, drag, and up input is received in step 524, control passes to step 526. If button down, drag, and up input is received in step 524, then control returns to step 510.

Step 526 determines if input is received to de-activate the high-lighter function, such as through click input received from graphical input device 108 on a "Deactivate High-Lighter" option from a tool bar menu, or from a pop-up menu accessed by right clicking graphical input device 108. If no input to deactivate the high-lighter function is received in step 526, control returns to step 508. If input to deactivate the high-lighter function is received in step 526, then in step 528 high-lighter icon 214 is replaced with the normal mouse cursor.

Step 530 determines if input is received to perform an optimized re-scan of the selected bitmapped data area within variable resolution preview scan 204, such as selected bitmapped data area 402. The input may be drag and drop input with graphical input device 108 of the selected area onto the desktop, a writeable folder, or onto an open application, or click input on pull down menus or buttons to launch the optimized re-scan. If no input to perform an optimized re-scan is received in step 530, then control passes to step 534. If input to perform an optimized re-scan is received in step 530, then in step 532 an optimized re-scan of the selected portions of variable resolution preview scan 204 is performed by scanner device 114 through scanner software 124, and the result is displayed in variable resolution preview window 202 (FIG. 2).

After performing the optimized re-scan, step 534 determines if input is received to activate the high-lighter function. If input is received in step 534 to activate the high-lighter function, control returns to step 506. If no input is received in step 534 to activate the high-lighter function, control returns to scanner software 124 where the user may access other functions within scanner software 124.

Figure 6:
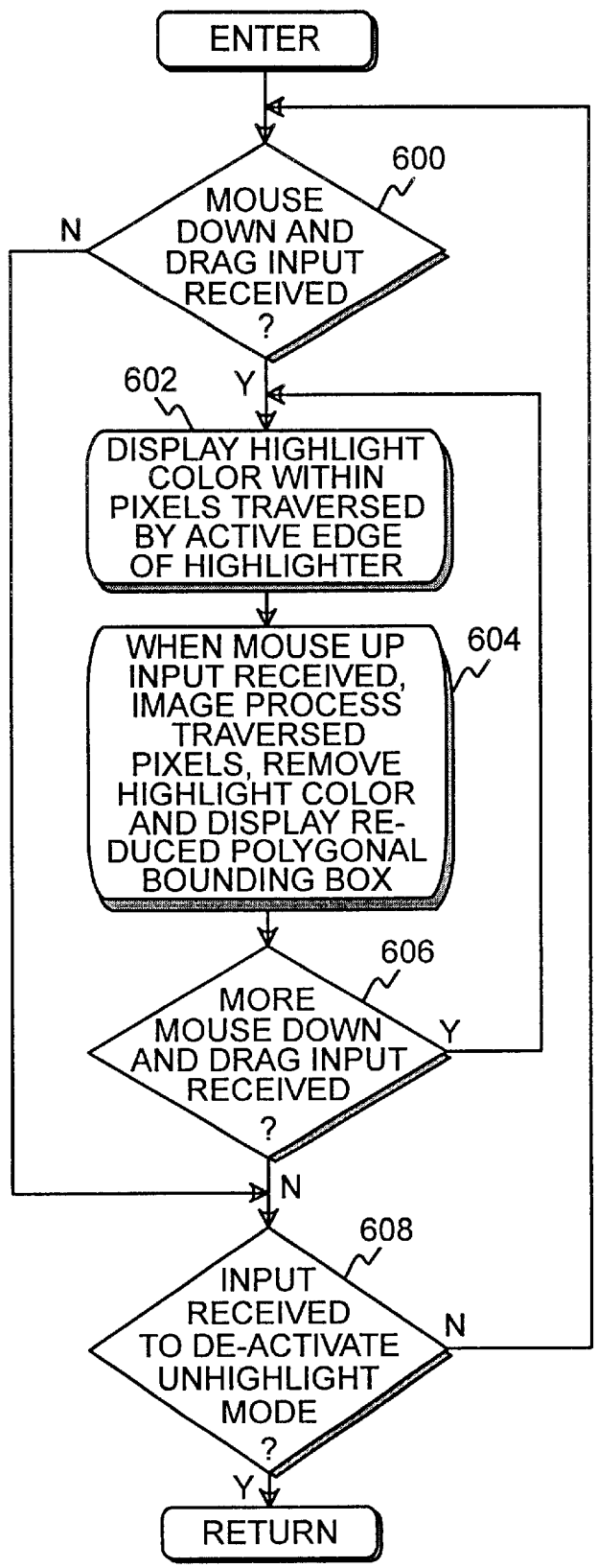
FIG. 6 shows a block diagram of the un-high-lighter mode of the user interface high-lighter function for scanner software of the present invention.

FIG. 6 shows a block diagram of the un-high-lighter mode of the user interface high-lighter function for scanner software of the present invention. Referring now to FIG. 6, which is called from step 522 in FIG. 5, step 600 determines if button down and drag input is received from graphical input device 108 (FIG. 1) utilizing high-lighter icon 214 (FIG. 2). If the answer is no, control passes to step 608. If the answer in step 600 is yes, then in step 602 the background pixels traversed by the active edge of high-lighter icon 214 are displayed in a different color from the current background color to visually indicate the portion of variable resolution preview scan 204 that the active edge 244 (FIG. 2) of high-lighter icon 214 has traversed, such as highlight area 424 (FIG. 4B).

In step 604, when button up input is received, the pixels traversed by the active edge 244 of high-lighter icon 214 from step 602 are image processed using any underlying analysis technique that can readily form text regions. In the preferred embodiment of the invention, the pixels traversed, including the beginning line and ending line of pixels, are used as substitute input for the click point of the Click and Select User Interface for Document Scanning. The image processing determines a reduced selected bitmapped data area, such as reduced selected bitmapped data area 430 (FIG. 4), which is derived from selected bitmapped data area 402 (FIGS. 4A and 4B).

The bitmapped area associated with cropped text 428 is deleted from selected bitmapped data area 402, yielding reduced selected bitmapped data area 430. The background pixels traversed by active edge 244 of high-lighter icon 214 in step 602 are redisplayed in their original color, and an altered polygonal bounding box, such as altered polygonal bounding box 426 (FIG. 4C), is displayed around reduced selected bitmapped data area 430. In an alternative embodiment of the invention, where the background pixels within the polygonal bounding box are displayed in the highlight color, the background pixels traversed in the un-highlight mode are redisplayed in the original background color, and the text pixels are displayed in their original color.

Step 606 determines if more button down and drag input is received. If yes, control returns to step 602. If no more button down and drag input is received in step 606, then step 608 determines if input is received to de-activate the un-highlight mode. If no, then control returns to step 600. If input is received to de-activate the un-highlight mode in step 608, then control returns to step 524 of FIG. 5B.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A user interface high-lighter method, within a computer system, for selecting at least one portion of text comprising the steps of:
   (a) displaying, on a monitor connected to said computer system, a scanned image containing at least one region of text;
   (b) receiving a first input in said computer system to activate said user interface high-lighter method;
   (c) displaying, in said monitor, a high-lighter icon in place of a cursor for a graphical input device, wherein said graphical input device is connected to said computer system;
   (d) receiving a first button down input from said graphical input device, wherein said first button down input identifies, from a first starting location of said high-lighter icon displayed on said monitor, a first beginning line of at least two pixels within said at least one region of text;
   (e) receiving a first button drag input from said graphical input device, wherein said first button drag input identifies, from a first interim movement of said high-lighter icon displayed on said monitor, a first interim region of pixels within said at least one region of text;
   (f) receiving a first button up input from said graphical input device, wherein said first button up input identifies, from a first ending location of said high-lighter icon displayed on said monitor, a first ending line of at least two pixels within said at least one region of text, wherein said first beginning line of at least two pixels, said first interim region of pixels, and said first ending line of at least two pixels comprise a first highlight area;
   (g) receiving a first select input to select said first highlight area as a first data input for an image processing routine; and
   (h) processing, by said image processing routine, a first portion of bitmapped data represented by said first data input to determine a first selected bitmapped data area, wherein said at least one portion of text from said at least one region of text within said scanned image is represented by said first selected bitmapped data area.

2. A user interface high-lighter method, within a computer system, for selecting at least one portion of text according to claim 1 wherein step (a) further comprises step (a0) performed before step (a):
   (a0) scanning at least one document with a scanner device connected to said computer system, wherein said scanning of said at least one document produces said scanned image containing said at least one region of text displayed on said monitor, and further wherein said scanned image is a variable resolution preview scan of said at least one document.

3. A user interface high-lighter method, within a computer system, for selecting at least one portion of text according to claim 1 wherein said high-lighter icon further comprises an active edge, wherein said active edge identifies said first beginning line of said at least two pixels from said first button down input from said graphical input device, said active edge identifies said first interim region of pixels from said first button drag input from said graphical input device, and said active edge identifies said first ending line of said at least two pixels from said first button up input from said graphical input device.

4. A user interface high-lighter method, within a computer system, for selecting at least one portion of text according to claim 1 wherein step (d) further comprises step (d1), step (e) further comprises step (e1), and step (f) further comprises step (f1):
   (d1) when said first beginning line of at least two pixels contains at least one background pixel, displaying all of said at least one background pixels from said first beginning line of at least two pixels in a different color from a current background color for said all of said at least one background pixels;
   (e1) when said first interim region of pixels contains at least one background pixel, displaying all of said at least one background pixels from said first interim region of pixels in said different color from said current background color for said all of said at least one background pixels; and
   (f1) when said first ending line of at least two pixels contains at least one background pixel, displaying all of said at least one background pixels from said first ending line of at least two pixels in said different color from said current background color for said all of said at least one background pixels.

5. A user interface high-lighter method, within a computer system, for selecting at least one portion of text according to claim 4 further comprising the steps of:
   (i) displaying said all of said at least one background pixels from said first beginning line of at least two pixels in said current background color;
   (j) displaying said all of said at least one background pixels from said first interim region of pixels in said current background color;
   (k) displaying said all of said at least one background pixels from said first ending line of at least two pixels in said current background color; and
   (l) displaying a polygonal bounding box around said at least one portion of text.

6. A user interface high-lighter method, within a computer system, for selecting at least one portion of text according to claim 5 further comprising the steps of:
   (m) receiving a second input in said computer system to activate an un-highlight mode of said user interface high-lighter method;
   (n) receiving a second button down input from said graphical input device from within said at least one portion of text, wherein said second button down input identifies, from a second starting location of said high-lighter icon displayed on said monitor, a second beginning line of at least two pixels within said at least one portion of text;
   (o) receiving a second button drag input from said graphical input device from within said at least one portion of text, wherein said second button drag input identifies, from a second interim movement of said high-lighter icon displayed on said monitor, a second interim region of pixels within said at least one portion of text;
   (p) receiving a second button up input from said graphical input device from within said at least one portion of text, wherein said second button up input identifies, from a second ending location of said high-lighter icon displayed on said monitor, a second ending line of at least two pixels within said at least one portion of text, wherein said second beginning line of at least two pixels, said second interim region of pixels, and said second ending line of at least two pixels comprise a second highlight area;
   (q) receiving said second highlight area as a second data input for said image processing routine;

(r) processing, by said image processing routine, a second portion of bitmapped data represented by said second data input to determine a second selected portion of bitmapped data contained within said first selected bitmapped data area;

(s) deleting said second selected portion of bitmapped data from said first selected bitmapped data area to form a reduced selected bitmapped data area, wherein said at least one portion of text is reduced to form a reduced said at least one portion of text from said at least one region of text within said scanned image, and further wherein said reduced said at least one portion of text is represented by said reduced selected bitmapped data area; and (t) displaying an altered polygonal bounding box around said reduced said at least one portion of text.

7. A user interface high-lighter method, within a computer system, for selecting at least one portion of text according to claim 6 wherein step (n) further comprises step (n1), step (o) further comprises step (o1), and step (f) further comprises step (p1):

(n1) when said second beginning line of at least two pixels contains at least one background pixel, displaying all of said at least one background pixels from said second beginning line of at least two pixels in said different color from said current background color for said all of said at least one background pixels;

(o1) when said second interim region of pixels contains at least one background pixel, displaying all of said at least one background pixels from said second interim region of pixels in said different color from said current background color for said all of said at least one background pixels; and (p1) when said second ending line of at least two pixels contains at least one background pixel, displaying all of said at least one background pixels from said second ending line of at least two pixels in said different color from said current background color for said all of said at least one background pixels.

8. A user interface high-lighter method, within a computer system, for selecting at least one portion of text according to claim 4 further comprising the steps of:

(i) displaying a polygonal bounding box around said at least one portion of text.

9. A user interface high-lighter method, within a computer system, for selecting at least one portion of text according to claim 8 further comprising the steps of:

(j) receiving a second input in said computer system to activate an un-highlight mode of said user interface high-lighter method;

(k) receiving a second button down input from said graphical input device from within said at least one portion of text, wherein said second button down input identifies, from a second starting location of said high-lighter icon displayed on said monitor, a second beginning line of at least two pixels within said at least one portion of text;

(l) receiving a second button drag input from said graphical input device from within said at least one portion of text, wherein said second button drag input identifies, from a second interim movement of said high-lighter icon displayed on said monitor, a second interim region of pixels within said at least one portion of text;

(m) receiving a second button up input from said graphical input device from within said at least one portion of text, wherein said second button up input identifies, from a second ending location of said high-lighter icon displayed on said monitor, a second ending line of at least two pixels within said at least one portion of text, wherein said second beginning line of at least two pixels, said second interim region of pixels, and said second ending line of at least two pixels comprise a second highlight area;

(n) receiving said second highlight area as a second data input for said image processing routine;

(o) processing, by said image processing routine, a second portion of bitmapped data represented by said second data input to determine a second selected portion of bitmapped data contained within said first selected bitmapped data area;

(p) deleting said second selected portion of bitmapped data from said first selected bitmapped data area to form a reduced selected bitmapped data area, wherein said at least one portion of text is reduced to form a reduced said at least one portion of text from said at least one region of text within said scanned image, and further wherein said reduced said at least one portion of text is represented by said reduced selected bitmapped data area; and (q) displaying an altered polygonal bounding box around said reduced said at least one portion of text.

10. A user interface high-lighter method, within a computer system, for selecting at least one portion of text according to claim 9 wherein step (n) further comprises step (n1), step (o) further comprises step (o1), and step (f) further comprises step (p1):

(k1) when said second beginning line of at least two pixels contains at least one background pixel, displaying all of said at least one background pixels from said second beginning line of at least two pixels in said current background color for said all of said at least one background pixels;

(l1) when said second interim region of pixels contains at least one background pixel, displaying all of said at least one background pixels from said second interim region of pixels in said current background color for said all of said at least one background pixels; and (m1) when said second ending line of at least two pixels contains at least one background pixel, displaying all of said at least one background pixels from said second ending line of at least two pixels in said current background color for said all of said at least one background pixels.

11. A user interface high-lighter method, within a computer system, for selecting at least one portion of text according to claim 1 further comprising the steps of:

(i) repeating steps (d) through (f) for receiving a second button down input from said graphical input device identifying, from a second starting location of said high-lighter icon displayed on said monitor, a second beginning line of at least two pixels, receiving a second button drag input from said graphical input device identifying, from a second interim movement of said high-lighter icon displayed on said monitor, a second interim region of pixels, and receiving a second button up input identifying, from a second ending location of said high-lighter icon displayed on said monitor, a second ending line of at least two pixels, within said at least one region of text, wherein said second beginning line of at least two pixels, said second interim region of pixels, and said second ending line of at least two pixels comprise a second highlight area; and (j) repeating steps (g) and (h), receiving said second highlight area as a second data input for said image processing routine, wherein said processing by said image processing routine of a second portion of bitmapped data represented by said second data input determines a second selected portion of bitmapped data, wherein said second selected portion of bitmapped data represents a next portion of text from said at least one region of text within said scanned image.

12. A user interface high-lighter method, within a computer system, for selecting at least one portion of text according to claim 1 further comprising the steps of:

(i) receiving a second input in said computer system to perform an optimized re-scan of said at least one portion of text from said at least one region of text within said scanned image;

(j) performing, with scanner software loaded into a memory in said computer system, said optimized re-scan of said at least one portion of text from said at least one region of text within said scanned image; and (k) displaying a result of said optimized re-scan in said monitor.

13. A user interface high-lighter method, within a computer system, for selecting at least one portion of text according to claim 1 wherein said graphical input device is a mouse.

14. A user interface high-lighter method, within a computer system, for selecting at least one portion of text comprising the steps of:

(a) displaying, on a monitor connected to said computer system, a scanned image containing at least one region of text;

(b) receiving a first input in said computer system to activate said user interface high-lighter method;

(c) displaying, in said monitor, a high-lighter icon in place of a cursor for a graphical input device, wherein said graphical input device is connected to said computer system;

(d) receiving a first button down, button drag, and button up input from said graphical input device, wherein said high-lighter icon, further comprising an active edge, is moved by said graphical input device within said at least one region of text, and further wherein a first plurality of pixels are traversed by said active edge of said high-lighter icon from said first button down, button drag, and button up input associated with said moving by said graphical input device;

(e) receiving a first select input to select said first plurality of pixels as a first data input for an image processing routine; and (f) processing, by said image processing routine, a first portion of bitmapped data represented by said first plurality of pixels to select said at least one portion of text from said at least one region of text within said scanned image.

15. A user interface high-lighter method, within a computer system, for selecting at least one portion of text according to claim 14 wherein step (a) further comprises step (a0) performed before step (a):

(a0) scanning at least one document with a scanner device connected to said computer system, wherein said scanning of said at least one document produces said scanned image containing said at least one region of text displayed on said monitor, and further wherein said scanned image is a variable resolution preview scan of said at least one document.

16. A user interface high-lighter method, within a computer system, for selecting at least one portion of text according to claim 14 wherein step (d) further comprises step (d1):

(d1) displaying in said monitor a first plurality of background pixels within said first plurality of pixels in a different color from a current background color for said first plurality of background pixels.

17. A user interface high-lighter method, within a computer system, for selecting at least one portion of text according to claim 16 further comprising the steps of:

(g) displaying said first plurality of background pixels within said first plurality of pixels in said current background color; and (h) displaying a polygonal bounding box around said at least one portion of text.

18. A user interface high-lighter method, within a computer system, for selecting at least one portion of text according to claim 17 further comprising the steps of:

(i) receiving a second input in said computer system to activate an un-highlight mode of said user interface high-lighter method;

(j) receiving a second button down, button drag, and button up input from moving said graphical input device within said at least one portion of text, wherein a second plurality of pixels are traversed by said active edge of said high-lighter icon from said second button down, button drag, and button up input associated with said moving of said graphical input device;

(k) receiving said second plurality of pixels as a second data input for said image processing routine;

(l) processing, by said image processing routine, a second portion of bitmapped data represented by said second plurality of pixels to select a portion of said at least one portion of text;

(m) deleting said second portion of bitmapped data from said first portion of bitmapped data to form a reduced selected bitmapped data area, wherein said at least one portion of text is reduced to form a reduced said at least one portion of text from said at least one region of text within said scanned image, and further wherein said reduced said at least one portion of text is represented by said reduced selected bitmapped data area; and (n) displaying an altered polygonal bounding box around said reduced said at least one portion of text.

19. A user interface high-lighter method, within a computer system, for selecting at least one portion of text according to claim 18 wherein step (j) further comprises step (j1):

(j1) displaying in said monitor a second plurality of background pixels within said second plurality of pixels in said different color from said current background color for said second plurality of background pixels.

20. A user interface high-lighter method, within a computer system, for selecting at least one portion of text according to claim 16 further comprising the step of:

(g) displaying a polygonal bounding box around said at least one portion of text.

21. A user interface high-lighter method, within a computer system, for selecting at least one portion of text according to claim 20 further comprising the steps of:

(h) receiving a second input in said computer system to activate an un-highlight mode of said user interface high-lighter method;

(i) receiving a second button down, button drag, and button up input from moving said graphical input device within said at least one portion of text, wherein a second plurality of pixels are traversed by said active edge of said high-lighter icon from said second button down, button drag, and button up input associated with said moving of said graphical input device;

(j) receiving said second plurality of pixels as a second data input for said image processing routine;

(k) processing, by said image processing routine, a second portion of bitmapped data represented by said second plurality of pixels to select a portion of said at least one portion of text;

(l) deleting said second portion of bitmapped data from said first portion of bitmapped data to form a reduced selected bitmapped data area, wherein said at least one portion of text is reduced to form a reduced said at least one portion of text from said at least one region of text within said scanned image, and further wherein said reduced said at least one portion of text is represented by said reduced selected bitmapped data area; and (m) displaying an altered polygonal bounding box around said reduced said at least one portion of text.

22. A user interface high-lighter method, within a computer system, for selecting at least one portion of text according to claim 21 wherein step (i) further comprises the step (i1):

(i1) displaying in said monitor a second plurality of background pixels within said second plurality of pixels in said current background color.

23. A user interface high-lighter method, within a computer system, for selecting at least one portion of text according to claim 14 wherein said first button down, button drag, and button up input further comprises a first button down input, a first button drag input, and a first button up input, and step (d) further comprises steps (d1) through (d3):

(d1) identifying, from a first starting location on said monitor with said active edge of said high-lighter icon from said first button down input, a first beginning line of at least two pixels of said plurality of pixels;

(d2) identifying, from a first interim movement on said monitor with said active edge of said high-lighter icon from said first button drag input, a first interim region of pixels of said plurality of pixels; and (d3) identifying, from a first ending location on said monitor with said active edge of said high-lighter icon from said first button up input, a first ending line of at least two pixels of said plurality of pixels.

24. A user interface high-lighter method, within a computer system, for selecting at least one portion of text according to claim 14 further comprising the steps of.

(g) repeating steps (d) and (e) for receiving a second button down, button drag, and button up input from said graphical input device, wherein a second plurality of pixels are traversed by said active edge of said high-lighter icon, and receiving a second select input to select said second plurality of pixels as a second data input for said image processing routine; and (h) repeating step (f), wherein said processing by said image processing routine of a second portion of bitmapped data represented by said second plurality of pixels selects a next portion of text from said at least one region of text within said scanned image.

25. A user interface high-lighter method, within a computer system, for selecting at least one portion of text according to claim 14 further comprising the steps of:

(g) receiving a second input in said computer system to perform an optimized re-scan of said at least one portion of text from said at least one region of text within said scanned image;

(h) performing, with scanner software loaded into a memory in said computer system, said optimized re-scan of said at least one portion of text from said at least one region of text within said scanned image; and (i) displaying a result of said optimized re-scan in said monitor.

26. A user interface high-lighter method, within a computer system, for selecting at least one portion of text according to claim 14 wherein said graphical input device is a mouse.

27. A system for selecting at least one portion of text, said system comprising:

a computer system for receiving a first input to activate a user interface high-lighter function;

a scanner device, connected to said computer system, for scanning at least one document placed in a position to be scanned by said scanner device;

a graphical input device connected to said computer system; and a monitor, connected to said computer system, for displaying a scanned image of said at least one document from said scanner device, wherein said scanned image contains at least one region of text, and for displaying a high-lighter icon in place of a cursor for said graphical input device, wherein said high-lighter icon has an active edge;

wherein, said computer system receives a first button down, button drag, and button up input from said graphical input device moving said high-lighter icon within said at least one region of text, and further wherein said computer system processes, by an image processing routine, a first portion of bitmapped data represented by a first plurality of pixels, wherein said first plurality of pixels are traversed by said active edge of said high-lighter icon from said first button down, button drag, and button up input associated with said moving of said high-lighter icon within said at least one region of text, generating a first selected bitmapped data area, wherein said at least one portion of text from said at least one region of text within said scanned image is represented by said first selected bitmapped data area.

28. A system for selecting at least one portion of text according to claim 27 wherein said scanned image is a variable resolution preview scan of said at least one document.

29. A system for selecting at least one portion of text according to claim 27 wherein a first plurality of background pixels within said first plurality of pixels are displayed in said monitor in a different color from a current background color for said first plurality of background pixels.

30. A system for selecting at least one portion of text according to claim 29 wherein after said processing by said image processing routine, said first plurality of background pixels within said first plurality of pixels are displayed in said current background color, and further wherein a polygonal bounding box is displayed around said at least one portion of text.

31. A system for selecting at least one portion of text according to claim 30 wherein said computer system receives a second input to activate an un-highlight mode of said user interface high-lighter method, wherein when said active edge of said high-lighter icon is moved over a portion of said at least one portion of text within said polygonal bounding box traversing a second plurality of pixels from a second button down, button drag, and button up input, said image processing routine processes a second portion of bitmapped data derived from said second plurality of pixels, and further wherein a second selected bitmapped data area generated from said processing of said second portion of bitmapped data is deleted from said first portion of bitmapped data, forming a reduced selected bitmapped data area, wherein said di least one portion of text is reduced to form a reduced said at least one portion of text from said at least one region of text within said scanned image, and further wherein said reduced said at least one portion of text is represented by said reduced selected bitmapped data area, and further wherein an altered polygonal bounding box is displayed around said reduced said at least one portion of text.

32. A system for selecting at least one portion of text according to claim 31 wherein a second plurality of background pixels within said second plurality of pixels are displayed in said monitor in said different color from said current background color for said second plurality of background pixels.

33. A system for selecting at least one portion of text according to claim 29 wherein a polygonal bounding box is displayed around said at least one portion of text.

34. A system for selecting at least one portion of text according to claim 33 wherein said computer system receives a second input to activate an un-highlight mode of said user interface high-lighter method, wherein when said active edge of said high-lighter icon is moved over a portion of said at least one portion of text within said polygonal bounding box traversing a second plurality of pixels from a second button down, button drag, and button up input, said image processing routine processes a second portion of bitmapped data derived from said second plurality of pixels, and further wherein a second selected bitmapped data area generated from said processing of said second portion of bitmapped data is deleted from said first portion of bitmapped data, forming a reduced selected bitmapped data area, wherein said at least one portion of text is reduced to form a reduced said at least one portion of text from said at least one region of text within said scanned image, and further wherein said reduced said at least one portion of text is represented by said reduced selected bitmapped data area, and further wherein an altered polygonal bounding box is displayed around said reduced said at least one portion of text.

35. A system for selecting at least one portion of text according to claim 34 wherein a second plurality of background pixels within said second plurality of pixels are displayed in said monitor in said current background color.

36. A system for selecting at least one portion of text according to claim 27 wherein a second button down, button drag, and button up input is received from said graphical input device, wherein a second plurality of pixels are traversed by said active edge of said high-lighter icon, and further wherein said image processing routine processes a second portion of bitmapped data represented by said second plurality of pixels to select a next portion of text from said at least one region of text within said scanned image.

37. A system for selecting at least one portion of text according to claim 27 wherein said first button down, button drag, and button up input further comprises a first button down input, a first button drag input, and a first button up input, and further wherein said first button down input identifies, from a first starting location on said monitor with said active edge of said high-lighter icon, a first beginning line of at least two pixels of said plurality of pixels, and further wherein said first button drag input identifies, from a first interim movement on said monitor with said active edge of said high-lighter icon, a first interim region of pixels of said plurality of pixels, and further wherein said first button up input identifies, from a first ending location on said monitor with said active edge of said high-lighter icon, a first ending line of at least two pixels of said plurality of pixels.

38. A system for selecting at least one portion of text according to claim 27 further comprising scanner software loaded into a memory of said computer system, wherein said scanner software performs an optimized re-scan of said at least one portion of text from said at least one region of text within said scanned image, and further wherein a result of said optimized re-scan is displayed in said monitor.

39. A system for selecting at least one portion of text according to claim 27 wherein said graphical input device is a mouse.

* * * * *